United States Patent
Lesage et al.

(10) Patent No.: US 10,119,013 B2
(45) Date of Patent: *Nov. 6, 2018

(54) TYRE TREAD

(75) Inventors: Pierre Lesage, Clermont-Ferrand (FR); Philippe Labrunie, Clermont-Ferrand (FR); Didier Vasseur, Clermont-Ferrand (FR); Xavier Saintigny, Clermont-Ferrand (FR)

(73) Assignee: COMPAGNIE GENERALE DES ETABLISSMENTS MICHELIN, Clermont-Ferrand (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/988,703

(22) PCT Filed: Nov. 24, 2011

(86) PCT No.: PCT/EP2011/070896
§ 371 (c)(1),
(2), (4) Date: Jun. 26, 2013

(87) PCT Pub. No.: WO2012/069567
PCT Pub. Date: May 31, 2012

(65) Prior Publication Data
US 2013/0296471 A1    Nov. 7, 2013

(30) Foreign Application Priority Data
Nov. 26, 2010 (FR) .................... 10 59810

(51) Int. Cl.
| | |
|---|---|
| *B60C 1/00* | (2006.01) |
| *C08L 9/06* | (2006.01) |
| *C08L 19/00* | (2006.01) |
| *C08L 7/00* | (2006.01) |
| *C08L 9/04* | (2006.01) |
| *C08L 47/00* | (2006.01) |
| *C08L 45/00* | (2006.01) |
| *C08K 3/34* | (2006.01) |
| *C08K 5/00* | (2006.01) |

(52) U.S. Cl.
CPC .............. *C08L 9/06* (2013.01); *B60C 1/0016* (2013.01); *C08L 19/006* (2013.01); *C08K 3/34* (2013.01); *C08K 5/0016* (2013.01); *C08L 7/00* (2013.01); *C08L 9/04* (2013.01); *C08L 45/00* (2013.01); *C08L 47/00* (2013.01); *C08L 2666/04* (2013.01); *C08L 2666/08* (2013.01)

(58) Field of Classification Search
CPC .......... C08L 19/06; C08L 9/06; C08L 19/006; C08L 7/00; C08L 9/04; C08L 47/00; C08L 45/00; C08L 2666/04; C08L 2666/08; B60C 1/00; B60C 1/0016; C08K 3/34; C08K 5/0016
USPC .......... 524/322, 499, 502, 526, 525
See application file for complete search history.

(56) References Cited

U.S. PATENT DOCUMENTS

| | | | |
|---|---|---|---|
| 4,229,333 A | 10/1980 | Wolff et al. ............. 260/23.7 M |
| 5,227,425 A * | 7/1993 | Rauline ......................... 524/493 |
| 5,409,969 A | 4/1995 | Hamada ........................ 523/213 |
| 5,508,333 A | 4/1996 | Shimizu ........................ 524/424 |
| 5,852,099 A | 12/1998 | Vanel ............................. 524/494 |
| 5,900,449 A | 5/1999 | Custodero et al. ........... 524/430 |
| 5,925,713 A | 7/1999 | Labauze ........................ 524/572 |
| 5,965,661 A | 10/1999 | du Bois et al. ............. 524/575.5 |
| 5,977,238 A | 11/1999 | Labauze ........................ 524/492 |
| 6,008,295 A | 12/1999 | Takeichi et al. .............. 525/105 |
| 6,013,718 A * | 1/2000 | Cabioch et al. .............. 524/506 |
| 6,071,995 A | 6/2000 | Labauze ........................ 524/269 |
| 6,201,059 B1 | 3/2001 | Wideman et al. ............ 524/518 |
| 6,204,322 B1 | 3/2001 | Labauze ........................ 524/572 |
| 6,214,919 B1 | 4/2001 | Schlademan et al. ........ 524/492 |
| 6,228,944 B1 | 5/2001 | Blok et al. .................... 525/210 |
| 6,265,478 B1 | 7/2001 | Kralevich, Jr. et al. ...... 524/518 |
| 6,316,567 B1 | 11/2001 | Kralevich, Jr. et al. ...... 526/283 |
| 6,329,457 B1 | 12/2001 | Datta et al. ................... 524/270 |
| 6,344,518 B1 | 2/2002 | Kobayashi et al. .......... 524/862 |
| 6,348,539 B1 | 2/2002 | Wideman et al. ............ 524/518 |
| 6,357,499 B1 | 3/2002 | Kralevich, Jr. et al. ... 152/209.1 |

(Continued)

FOREIGN PATENT DOCUMENTS

| | | |
|---|---|---|
| AU | 3016095 A | 3/1996 |
| DE | 10 2008 026 351 A1 | 12/2009 |

(Continued)

OTHER PUBLICATIONS

U.S. Appl. No. 13/988,709, filed Nov. 24, 2011.
U.S. Appl. No. 13/988,699, filed Nov. 24, 2011.
U.S. Appl. No. 13/641,564, filed May 2, 2011.
R. Mildenberg, et al.; Hydrocarbon Resins, VCH, New York, Chapter 5, pp. 141-146 (1997).
Z.Q. Liu, et al., "Effects of Glycerin and Glycerol Monostearate on Performance of Thermoplastic Starch," J. Mater. Sci., vol. 36, No. 7, pp. 1809-1815 (2001).
S. Otto, et al., "New Reference Value for the Description of Filler Dispersion with the Dispergrader 1000 NT", KGK Kautschuk Gummi Kunststoffe 58, Jahrgang, Nr. 7-8/2005, pp. 390-393.

(Continued)

*Primary Examiner* — Angela C Scott
(74) *Attorney, Agent, or Firm* — Fitzpatrick, Cella, Harper & Scinto

(57) ABSTRACT

A tire, which has an improved grip on wet ground, includes a tread formed of at least a rubber composition. The rubber composition includes: 20 to 100 phr of a first diene elastomer bearing at least one SiOR function, with R being hydrogen or a hydrocarbon radical, and with phr referring to parts by weight per hundred parts of elastomer; 100 to 160 phr of a reinforcing inorganic filler; and a plasticizing system. The plasticizing system includes: a content A of between 5 and 60 phr of a hydrocarbon resin having a Tg above 20° C.; and a content B of between 5 and 60 phr of a liquid plasticizing agent. A total content A+B is greater than 45 phr. The rubber composition optionally includes 0 to 80 phr of a second diene elastomer.

29 Claims, No Drawings

(56) References Cited

U.S. PATENT DOCUMENTS

| | | | |
|---|---|---|---|
| 6,420,488 B1 | 7/2002 | Penot | 525/332.7 |
| 6,455,624 B1 | 9/2002 | Serre | |
| 6,503,973 B2 | 1/2003 | Robert et al. | 524/492 |
| 6,512,036 B2 | 1/2003 | Wideman et al. | 524/311 |
| 6,536,492 B2 | 3/2003 | Vasseur | 152/450 |
| 6,774,255 B1 | 8/2004 | Tardivat et al. | 556/427 |
| 6,815,473 B2 | 11/2004 | Robert et al. | 523/215 |
| 6,849,754 B2 | 2/2005 | Deschler et al. | 556/427 |
| 7,071,251 B2 | 7/2006 | Thielen et al. | 524/47 |
| 7,119,147 B2 | 10/2006 | Kikuchi | |
| 7,199,175 B2 | 4/2007 | Vasseur | 524/492 |
| 7,217,751 B2 | 5/2007 | Durel et al. | 524/262 |
| 7,250,463 B2 | 7/2007 | Durel et al. | 524/492 |
| 7,253,225 B2 | 8/2007 | Labauze et al. | 524/313 |
| 7,259,205 B1 | 8/2007 | Pagliarini et al. | 524/493 |
| 7,300,970 B2 | 11/2007 | Durel et al. | 524/493 |
| 7,312,264 B2 | 12/2007 | Gandon-Pain | 524/236 |
| 7,335,692 B2 * | 2/2008 | Vasseur et al. | 524/312 |
| 7,432,318 B2 | 10/2008 | Kikuchi | |
| 7,488,768 B2 | 2/2009 | Tardivat et al. | 524/262 |
| 7,491,767 B2 | 2/2009 | Durel et al. | 524/493 |
| 7,588,065 B2 | 9/2009 | Serre | |
| 7,629,408 B2 | 12/2009 | Cambon et al. | 524/492 |
| 7,671,128 B1 | 3/2010 | Thielen et al. | 524/526 |
| 7,671,132 B1 | 3/2010 | Thielen et al. | 525/191 |
| 7,709,561 B2 | 5/2010 | Ohashi et al. | |
| 7,820,771 B2 | 10/2010 | Lapra et al. | 525/479 |
| 7,829,621 B2 | 11/2010 | Kunisawa et al. | 524/482 |
| 7,834,074 B2 | 11/2010 | Brunelet et al. | 524/318 |
| 7,900,667 B2 | 3/2011 | Vasseur | 152/209.1 |
| 7,981,966 B2 | 7/2011 | Kobayashi et al. | 525/237 |
| 7,999,029 B2 | 8/2011 | Yan et al. | 524/528 |
| 8,178,605 B2 | 5/2012 | Lopitaux et al. | 524/306 |
| 8,236,888 B2 | 8/2012 | Yan et al. | 524/528 |
| 8,318,861 B2 | 11/2012 | Houjo et al. | |
| 8,324,310 B2 | 12/2012 | Robert et al. | 524/518 |
| 8,344,063 B2 | 1/2013 | Marechal et al. | 524/571 |
| 8,362,118 B2 | 1/2013 | Mihara | 524/77 |
| 8,389,612 B2 | 3/2013 | Miyazaki | 524/331 |
| 8,404,766 B2 | 3/2013 | Miyazaki | 524/331 |
| 8,637,597 B2 | 1/2014 | Lopitaux | |
| 8,815,995 B2 | 8/2014 | Vest et al. | B60C 1/0016 |
| 9,040,613 B2 | 5/2015 | Lopitaux et al. | C08K 5/12 |
| 2001/0016636 A1 | 8/2001 | Wideman et al. | 526/283 |
| 2002/0068781 A1 | 6/2002 | Serre | |
| 2002/0143086 A1 | 10/2002 | Wideman et al. | 524/306 |
| 2004/0092644 A1 | 5/2004 | Labauze | 524/492 |
| 2004/0122157 A1 | 6/2004 | Labauze | 524/487 |
| 2004/0127617 A1 | 7/2004 | Vasseur et al. | 524/318 |
| 2004/0211111 A1 | 10/2004 | Kikuchi | |
| 2005/0148713 A1 | 7/2005 | Labauze et al. | 524/311 |
| 2005/0171260 A1 | 8/2005 | Kikuchi | |
| 2005/0171267 A1 | 8/2005 | Zanzig et al. | 524/492 |
| 2005/0209413 A1 | 9/2005 | Labauze et al. | 525/333.3 |
| 2006/0089445 A1 | 4/2006 | Gandon-Pain | 524/492 |
| 2006/0094815 A1 | 5/2006 | Kunisawa et al. | 524/496 |
| 2006/0116457 A1 | 6/2006 | Cambon et al. | 524/261 |
| 2006/0167160 A1 | 7/2006 | Nakagawa et al. | 524/442 |
| 2006/0167163 A1 | 7/2006 | Ohashi et al. | |
| 2007/0175557 A1 | 8/2007 | Puhala et al. | 152/209.5 |
| 2007/0185267 A1 | 8/2007 | Kobayashi et al. | 525/191 |
| 2007/0293619 A1 | 12/2007 | Jacoby et al. | 524/493 |
| 2008/0156404 A1 * | 7/2008 | Brunelet et al. | 152/209.1 |
| 2008/0251174 A1 | 10/2008 | Romani et al. | 152/209.1 |
| 2008/0319125 A1 | 12/2008 | Boswell et al. | 524/543 |
| 2009/0093593 A1 | 4/2009 | Kato et al. | 525/275 |
| 2009/0186961 A1 | 7/2009 | Araujo Da Silva et al. | 523/150 |
| 2009/0209709 A1 | 8/2009 | Arauja Da Silva et al. | 525/333.1 |
| 2009/0234066 A1 | 9/2009 | Araujo Da Silva et al. | 524/571 |
| 2009/0270558 A1 | 10/2009 | Gandon-Pain et al. | 525/190 |
| 2009/0292063 A1 | 11/2009 | Robert et al. | 524/518 |
| 2009/0294012 A1 | 12/2009 | Serre | |
| 2010/0022714 A1 | 1/2010 | Varagniat et al. | 525/209 |
| 2010/0025627 A1 | 2/2010 | Naoi et al. | |
| 2010/0036019 A1 | 2/2010 | Miyazaki | 523/157 |
| 2010/0099796 A1 | 4/2010 | Lopitaux et al. | 523/156 |
| 2010/0113703 A1 | 5/2010 | Houjo et al. | 525/232 |
| 2010/0145089 A1 | 6/2010 | Mignani et al. | 556/429 |
| 2010/0179247 A1 | 7/2010 | Vest et al. | 523/150 |
| 2010/0184912 A1 | 7/2010 | Marechal et al. | 524/571 |
| 2010/0204358 A1 | 8/2010 | Lopitaux | 523/152 |
| 2010/0204372 A1 * | 8/2010 | Miyazaki | 524/104 |
| 2010/0216935 A1 | 8/2010 | Boswell et al. | 524/543 |
| 2010/0249270 A1 | 9/2010 | Robert et al. | 523/150 |
| 2010/0252156 A1 | 10/2010 | Robert et al. | 152/209.1 |
| 2010/0292366 A1 | 11/2010 | Herzog et al. | 523/150 |
| 2010/0300593 A1 | 12/2010 | Merino Lopez et al. | 152/504 |
| 2011/0021702 A1 | 1/2011 | Gandon-Pain et al. | 525/55 |
| 2011/0040002 A1 | 2/2011 | Lopitaux et al. | 524/295 |
| 2011/0061782 A1 | 3/2011 | Merino Lopez et al. | 152/503 |
| 2011/0144236 A1 | 6/2011 | Mihara | 523/158 |
| 2011/0152458 A1 | 6/2011 | Araujo Da Silva et al. | 525/102 |
| 2011/0178233 A1 | 7/2011 | Chaboche et al. | 524/571 |
| 2011/0184084 A1 | 7/2011 | Katou | 523/156 |
| 2011/0190416 A1 | 8/2011 | Maesaka et al. | 523/155 |
| 2011/0294953 A1 | 12/2011 | Seeboth et al. | 525/102 |
| 2011/0319646 A1 | 12/2011 | Boswell et al. | 556/428 |
| 2012/0095153 A1 | 4/2012 | Tokimune et al. | 524/526 |
| 2012/0208948 A1 | 8/2012 | Gandon-Pain et al. | 524/521 |
| 2012/0245270 A1 | 9/2012 | Blanchard et al. | 524/388 |
| 2013/0005894 A1 | 1/2013 | Lopitaux et al. | 524/432 |
| 2013/0267640 A1 * | 10/2013 | Lopez et al. | 524/322 |
| 2013/0274404 A1 | 10/2013 | Vasseur et al. | 524/526 |
| 2013/0299053 A1 | 11/2013 | Fugier et al. | 152/209.8 |

FOREIGN PATENT DOCUMENTS

| | | | |
|---|---|---|---|
| DE | 10 2008 037 593 A1 | | 5/2010 |
| EP | 0 341 496 A2 | | 11/1989 |
| EP | 0501227 | * | 2/1992 |
| EP | 0 501 227 A1 | | 9/1992 |
| EP | 0 590 490 A1 | | 4/1994 |
| EP | 0 626 278 A1 | | 11/1994 |
| EP | 0 692 492 A1 | | 1/1996 |
| EP | 0 735 088 A1 | | 10/1996 |
| EP | 0 778 311 A1 | | 6/1997 |
| EP | 0 795 581 A1 | | 9/1997 |
| EP | 0 810 258 A1 | | 12/1997 |
| EP | 0 877 047 A1 | | 11/1998 |
| EP | 0 890 607 A1 | | 1/1999 |
| EP | 1 000 970 A1 | | 5/2000 |
| EP | 1 028 130 A1 | | 8/2000 |
| EP | 1 029 873 A1 | | 8/2000 |
| EP | 1 029 874 A1 | | 8/2000 |
| EP | 1028007 A1 | | 8/2000 |
| EP | 1 050 547 A1 | | 11/2000 |
| EP | 1 074 582 A1 | | 2/2001 |
| EP | 1 077 223 A1 | | 2/2001 |
| EP | 1 077 229 A1 | | 2/2001 |
| EP | 1 127 909 A1 | | 8/2001 |
| EP | 1 227 125 A1 | | 7/2002 |
| EP | 1 293 530 A2 | | 3/2003 |
| EP | 1 312 639 A1 | | 5/2003 |
| EP | 1329478 A1 | | 7/2003 |
| EP | 1 400 559 A1 | | 3/2004 |
| EP | 1 400 560 A1 | | 3/2004 |
| EP | 1 431 075 A1 | | 6/2004 |
| EP | 1 457 501 A1 | | 9/2004 |
| EP | 1 514 900 A1 | | 3/2005 |
| EP | 1559585 A1 | | 8/2005 |
| EP | 1561780 A1 | | 8/2005 |
| EP | 1 621 579 A1 | | 2/2006 |
| EP | 1648960 B1 | | 4/2006 |
| EP | 1 652 878 A1 | | 5/2006 |
| EP | 1676882 A1 | | 7/2006 |
| EP | 1 721 930 A1 | | 11/2006 |
| EP | 1818188 A1 | | 8/2007 |
| EP | 1 829 934 A1 | | 9/2007 |
| EP | 1 911 797 A1 | | 4/2008 |
| EP | 2 060 604 A1 | | 5/2009 |

(56) References Cited

FOREIGN PATENT DOCUMENTS

| | | |
|---|---|---|
| EP | 2 070 952 A1 | 6/2009 |
| EP | 2103650 A1 | 9/2009 |
| EP | 2104705 B1 | 9/2009 |
| EP | 2150422 B1 | 2/2010 |
| EP | 2 159 074 A1 | 3/2010 |
| EP | 2204406 A1 | 7/2010 |
| EP | 2239296 A1 | 10/2010 |
| EP | 2643403 A1 | 10/2013 |
| FR | 2 740 778 A1 | 5/1997 |
| FR | 2 765 882 A1 | 1/1999 |
| JP | 55-60539 A | 5/1980 |
| JP | 59-15940 B2 | 4/1984 |
| JP | 60-179434 A | 9/1985 |
| JP | 62-227908 | 6/1987 |
| JP | 63-215701 | 8/1988 |
| JP | 63-314255 A | 12/1988 |
| JP | 5-214170 A | 8/1993 |
| JP | 6-240052 A | 8/1994 |
| JP | 6-248117 A | 9/1994 |
| JP | 7-70370 A | 3/1995 |
| JP | 7-90124 A | 4/1995 |
| JP | 7-133377 A | 5/1995 |
| JP | H08-59924 A | 3/1996 |
| JP | 9-136996 A | 5/1997 |
| JP | 9-143312 A | 6/1997 |
| JP | 9-165471 A | 6/1997 |
| JP | 9-208621 A | 8/1997 |
| JP | 9-208632 A | 8/1997 |
| JP | 9-208748 A | 8/1997 |
| JP | H09-302146 A | 11/1997 |
| JP | 10-53003 A | 2/1998 |
| JP | 10-501291 A | 2/1998 |
| JP | 10-204216 | 8/1998 |
| JP | 10-237224 A | 9/1998 |
| JP | 11-29656 A | 2/1999 |
| JP | 11-49894 A | 2/1999 |
| JP | 11-228647 A | 8/1999 |
| JP | 2000-52707 A | 2/2000 |
| JP | 2000-204274 A | 7/2000 |
| JP | 2000-230080 A | 8/2000 |
| JP | 2000-230081 A | 8/2000 |
| JP | 2000-233454 A | 8/2000 |
| JP | 2000-239448 A | 9/2000 |
| JP | 2000-256515 A | 9/2000 |
| JP | 2000-344839 A | 12/2000 |
| JP | 2001-11240 A | 1/2001 |
| JP | 2001-26622 A | 1/2001 |
| JP | 2001-89597 A | 4/2001 |
| JP | 2001-98036 A | 4/2001 |
| JP | 2001-348461 A | 12/2001 |
| JP | 2002-20542 A | 1/2002 |
| JP | 2002-114874 A | 4/2002 |
| JP | 2002-226629 A | 8/2002 |
| JP | 2002-284934 A | 10/2002 |
| JP | 2003-155398 A | 5/2003 |
| JP | 2003-213039 A | 7/2003 |
| JP | 2003-253051 A | 9/2003 |
| JP | 2004-137463 A | 5/2004 |
| JP | 2004-161958 A | 6/2004 |
| JP | 2004-518806 A | 6/2004 |
| JP | 2004-518807 A | 6/2004 |
| JP | 2004-519551 | 7/2004 |
| JP | 2005-213415 A | 8/2005 |
| JP | 2005-213508 A | 8/2005 |
| JP | 2005-220251 A | 8/2005 |
| JP | 2005-263905 A | 9/2005 |
| JP | 2005-307166 A | 11/2005 |
| JP | 2005-534759 A | 11/2005 |
| JP | 2005-537369 A | 12/2005 |
| JP | 2006-124601 A | 5/2006 |
| JP | 2006-249188 A | 9/2006 |
| JP | 2006-249230 A | 9/2006 |
| JP | 2006-282830 A | 10/2006 |
| JP | 2006-306962 A | 11/2006 |
| JP | 2006-306965 A | 11/2006 |
| JP | 2006-307096 A | 11/2006 |
| JP | 2006-528253 A | 12/2006 |
| JP | 2007-70451 A | 3/2007 |
| JP | 2007-77374 A | 3/2007 |
| JP | 2007-161819 A | 6/2007 |
| JP | 2007-522299 | 8/2007 |
| JP | 2007-262206 A | 10/2007 |
| JP | 2007-262292 A | 10/2007 |
| JP | 2007-277307 A | 10/2007 |
| JP | 2007-321046 A | 12/2007 |
| JP | 2007-332246 A | 12/2007 |
| JP | 2008-1747 A | 1/2008 |
| JP | 2008-1900 A | 1/2008 |
| JP | 2008-88425 A | 4/2008 |
| JP | 2008-169296 A | 7/2008 |
| JP | 2008-169298 A | 7/2008 |
| JP | 2008-174664 A | 7/2008 |
| JP | 2008-174688 A | 7/2008 |
| JP | 2008-174696 A | 7/2008 |
| JP | 2008-525537 A | 7/2008 |
| JP | 2008-184505 A | 8/2008 |
| JP | 2008-189725 A | 8/2008 |
| JP | 2008-201933 A | 9/2008 |
| JP | 2008-208265 A | 9/2008 |
| JP | 2008-214590 A | 9/2008 |
| JP | 2008-231209 A | 10/2008 |
| JP | 2008-248203 A | 10/2008 |
| JP | 2008-274017 A | 11/2008 |
| JP | 2008-274207 A | 11/2008 |
| JP | 2009-001721 A | 1/2009 |
| JP | 2009-504810 A | 2/2009 |
| JP | 2009-62485 A | 3/2009 |
| JP | 2009-102506 A | 5/2009 |
| JP | 2009-114262 A | 5/2009 |
| JP | 2009-114427 A | 5/2009 |
| JP | 2009-120845 A | 6/2009 |
| JP | 2009-144175 A | 7/2009 |
| JP | 2009-166519 A | 7/2009 |
| JP | 2009-263456 A | 11/2009 |
| JP | 2009-263587 A | 11/2009 |
| JP | 2009-298920 A | 12/2009 |
| JP | 2010-59398 A | 3/2010 |
| JP | 2010-116557 A | 5/2010 |
| JP | 2010-514860 A | 5/2010 |
| JP | 2010-514861 A | 5/2010 |
| JP | 2010-126672 A | 6/2010 |
| JP | 2010-155935 A | 7/2010 |
| JP | 2010-522800 A | 7/2010 |
| JP | 2010-525087 A | 7/2010 |
| JP | 2010-168491 A | 8/2010 |
| JP | 2010-526923 A | 8/2010 |
| JP | 2010-526924 A | 8/2010 |
| JP | 2010-209174 A | 9/2010 |
| JP | 2010-209197 A | 9/2010 |
| JP | 2010-229253 A | 10/2010 |
| JP | 2010-235663 A | 10/2010 |
| JP | 2010-241965 A | 10/2010 |
| JP | 2011-122057 A | 6/2011 |
| JP | 5909756 B2 | 4/2016 |
| WO | 95/34601 A1 | 12/1995 |
| WO | WO 96/37547 A2 | 11/1996 |
| WO | WO 97/36724 | 10/1997 |
| WO | WO 99/09036 A1 | 2/1999 |
| WO | WO 99/16600 | 4/1999 |
| WO | WO 99/928380 A1 | 6/1999 |
| WO | WO 00/05300 A1 | 2/2000 |
| WO | WO 00/05301 A1 | 2/2000 |
| WO | WO 01/92402 A1 | 12/2001 |
| WO | WO 02/10269 A2 | 2/2002 |
| WO | WO 02/30939 A1 | 4/2002 |
| WO | WO 02/31041 A1 | 4/2002 |
| WO | WO 02/083782 A1 | 10/2002 |
| WO | WO 02/088238 A1 | 11/2002 |
| WO | WO 03/002648 A1 | 1/2003 |
| WO | WO 03/002649 A1 | 1/2003 |
| WO | WO 03/016387 A1 | 2/2003 |
| WO | WO 2004/096865 A2 | 11/2004 |
| WO | WO 2004/111094 A1 | 12/2004 |
| WO | 2005/056615 A1 | 6/2005 |

(56) References Cited

FOREIGN PATENT DOCUMENTS

| | | |
|---|---|---|
| WO | 2005/085343 A1 | 9/2005 |
| WO | WO 2006/023815 A2 | 3/2006 |
| WO | WO 2006/050486 A1 | 5/2006 |
| WO | 2006/066615 | 6/2006 |
| WO | WO 2006/069792 A1 | 7/2006 |
| WO | WO 2006/069793 A1 | 7/2006 |
| WO | WO 2006/076629 A1 | 7/2006 |
| WO | WO 2006/125532 A1 | 11/2006 |
| WO | WO 2006/125533 A1 | 11/2006 |
| WO | WO 2006/125534 A1 | 11/2006 |
| WO | WO 2007/061550 A1 | 5/2007 |
| WO | WO 2007/098080 A2 | 8/2007 |
| WO | WO 2008/003434 A1 | 1/2008 |
| WO | WO 2008/003435 A1 | 1/2008 |
| WO | WO 2008/055986 A2 | 5/2008 |
| WO | WO 2008/141702 A1 | 11/2008 |
| WO | WO 2009/000750 A1 | 12/2008 |
| WO | WO 2009/000752 A1 | 12/2008 |
| WO | WO 2009/125747 A1 | 10/2009 |
| WO | WO 2009/133068 A1 | 11/2009 |
| WO | 2010/009850 A1 | 1/2010 |
| WO | WO 2010/072685 A1 | 7/2010 |
| WO | 2010/116988 A1 | 10/2010 |

OTHER PUBLICATIONS

Rubber Term Glossary, Japan, Society of Rubber Science and Technology, Jul. 10, 1978, 1st Edition, pp. 124-125 with partial English translation (2 pages).

Office Action dated Mar. 24, 2016, in JP Application No. 2013-540362 with English translation (13 pages).

Written Opposition dated Jun. 24, 2016, in Japanese Patent No. 5837086, English translation (153 pages).

A. Yasui, "Application of Highly Hydrogenated Terpene Phenolic Resin to Electronic Materia", Journal of the Society of Rubber Industry, Japan vol. 80, No. 1, pp. 19-24 (2007).

"Measurement of thermal denaturation temperature of natural polymer by thermal analysis," Technical Information by Hokkaido Industrial Research Institute, vol. 28 (110th volumes), No. 4, 1 p. (2006).

"Progress of rubber for tyre; silica-containing tyre for low fuel consumption", Network Polymer, vol. 33, No. 5, pp. 242-248 (2012).

"Rubber and filler," Japan Rubber Association Journal, vol. 71, No. 9, pp. 583-587 (1998).

"Silica reinforced polymer in view of recent patents," Japan Rubber Association Journal, vol. 71, No. 9, pp. 562-570 (1998).

"Comparison of carbon and silica in tread composition," Japan Rubber Association Journal, vol. 72, No. 7, pp. 697-700 1999).

"Relation between basic property and performance of carbon black," Japan Rubber Association Journal, vol. 58, No. 10, pp. 644-657 (1985).

"Dictionary of rubber," Asakura Book Store, first edition, second printing, pp. 280-283 (2004).

"New edition Basis of rubber technology," Japan Rubber Association, pp. 146-149, 197-201 and 208-213 (1999).

"Poval," available at: <http://www.kuraray.co.jp/products/question/plastidpoval.html> Accessed on Dec. 15, 2017.

\* cited by examiner

TYRE TREAD

FIELD OF THE INVENTION

The field of the invention is that of rubber compositions for tyres, more specifically rubber compositions for a tread.

BACKGROUND

As is known, a tyre tread has to meet a large number of often conflicting technical requirements, including a low rolling resistance, a high wear resistance, and a high grip on both the dry road and the wet road.

This compromise in properties, in particular from the viewpoint of the rolling resistance and the wear resistance, has been improved in recent years with regard to energy-saving "Green Tyres", intended in particular for passenger vehicles, by virtue in particular of the use of novel low hysteresis rubber compositions having the feature of being reinforced predominantly by specific inorganic fillers, described as reinforcing fillers, in particular by highly dispersible silicas (HDSs), capable of rivaling, from the viewpoint of reinforcing power, conventional tyre-grade carbon blacks.

Enhancing the grip properties, in particular on wet ground, remains however a constant concern of tyre designers.

BRIEF DESCRIPTION OF THE INVENTION

By continuing their research, the Applicants have unexpectedly discovered that the combined use of certain functional diene elastomers, a reinforcing inorganic filler and a specific plasticizing system makes it possible to improve the grip performance of these tyres on wet ground with low rolling resistance.

Thus, one subject of the invention is a tyre, the tread of which comprises a rubber composition, said rubber composition comprising at least:
- 20 to 100 phr of a first diene elastomer bearing at least one SiOR function, R being a hydrogen or a hydrocarbon radical;
- optionally 0 to 80 phr of a second diene elastomer;
- 100 to 160 phr of a reinforcing inorganic filler;
- a plasticizing system comprising:
  - in a content A of between 5 and 60 phr, a hydrocarbon resin having a Tg above 20° C.;
  - in a content B of between 5 and 60 phr, a liquid plasticizing agent;
  - it being understood that the total content A+B is greater than 45 phr.

The tyres of the invention are particularly intended to be fitted onto motor vehicles of the passenger type, including 4×4 (four-wheel drive) vehicles and SUV vehicles (Sport Utility Vehicles), two-wheel vehicles (especially motorcycles), and also industrial vehicles chosen in particular from vans and heavy-duty vehicles (i.e. underground trains, buses and heavy road transport vehicles such as lorries and tractor units).

The invention and its advantages will be readily understood in the light of the description and the exemplary embodiments that follow.

I—DETAILED DESCRIPTION OF THE INVENTION

In the present description, unless expressly indicated otherwise, all the percentages (%) shown are % by weight.

The abbreviation "phr" stands for parts by weight per hundred parts of elastomer (of the total of the elastomers if several elastomers are present). All the values of the glass transition temperature "Tg" are measured in a known manner by DSC (Differential Scanning calorimetry) according to the standard ASTM D3418 (1999).

Moreover, any range of values denoted by the expression "between a and b" represents the field of values ranging from more than a to less than b (that is to say limits a and b excluded) whereas any range of values denoted by the expression "from a to b" means the field of values ranging from a up to b (that is to say including the strict limits a and b).

I-1. Diene Elastomer

A "diene" elastomer (or "rubber", the two terms being considered to be synonymous) should be understood, in a known manner, to mean an (one or more is understood) elastomer resulting at least in part (i.e., a homopolymer or a copolymer) from diene monomers (monomers bearing two carbon-carbon double bonds which may or may not be conjugated).

These diene elastomers can be classified into two categories: "essentially unsaturated" or "essentially saturated". Generally, the expression "essentially unsaturated" is understood to mean a diene elastomer resulting at least in part from conjugated diene monomers having a content of units of diene origin (conjugated dienes) which is greater than 15% (mol %); thus it is that diene elastomers such as butyl rubbers or diene/α-olefin copolymers of the EPDM type do not fall under the preceding definition and may especially be described as "essentially saturated" diene elastomers (low or very low content of units of diene origin, always less than 15%). In the category of "essentially unsaturated" diene elastomers, the expression "highly unsaturated" diene elastomer is understood to mean in particular a diene elastomer having a content of units of diene origin (conjugated dienes) which is greater than 50%.

Although it applies to any type of diene elastomer, a person skilled in the art of tyres will understand that the invention is preferably employed with essentially unsaturated diene elastomers.

Given these definitions, the expression diene elastomer capable of being used in the compositions in accordance with the invention is understood in particular to mean:
- (a)—any homopolymer obtained by polymerization of a conjugated diene monomer, preferably having from 4 to 12 carbon atoms;
- (b)—any copolymer obtained by copolymerization of one or more conjugated dienes with one another or with one or more vinylaromatic compounds preferably having from 8 to 20 carbon atoms.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers may contain between 99% and 20% by weight of diene units and between 1% and 80% by weight of vinylaromatic units.

More preferably, use is made of a first diene elastomer selected from the group consisting of polybutadienes (BRs)

(especially those having a content of cis-1,4-bonds of greater than 90%), synthetic polyisoprenes (IRs), natural rubber (NR), butadiene copolymers, in particular butadiene-styrene copolymers (SBRs), and blends of these elastomers.

The following are suitable: polybutadienes, in particular those having a content (molar %) of 1,2-units of between 4% and 80% or those having a content (molar %) of cis-1,4-units of greater than 80%, polyisoprenes, butadiene-styrene copolymers and in particular those having a Tg (glass transition temperature Tg, measured according to standard ASTM D3418) of between 0° C. and −70° C. and more particularly between 10° C. and 60° C., a styrene content of between 5% and 60% by weight and more particularly between 20% and 50%, a content (molar %) of 1,2-bonds of the butadiene part of between 4% and 75% and a content (molar %) of trans-1,4-bonds of between 10% and 80%.

According to one particular embodiment of the invention, the first diene elastomer has a glass transition temperature in a range extending from −55° C. to −5° C., preferably from −50° C. to −10° C.

The first diene elastomer may have any microstructure which depends on the polymerization conditions used, in particular on the presence or absence of a modifying and/or randomizing agent and on the amounts of modifying and/or randomizing agent employed. This elastomer may, for example, be a block, statistical, sequential or microsequential elastomer and may be prepared in dispersion or in solution.

An essential feature of the rubber composition of the tread of the tyre in accordance with the invention is to comprise a first diene elastomer bearing at least one (i.e. one or more) SiOR function, R being hydrogen or a hydrocarbon radical, especially an alkyl, preferably having 1 to 12 carbon atoms, in particular methyl or ethyl.

The expression "hydrocarbon radical" means a monovalent group essentially consisting of carbon and hydrogen atoms, it being possible for such a group to comprise at least one heteroatom, knowing that the assembly formed by the carbon and hydrogen atoms represents the major number fraction in the hydrocarbon radical.

According to one particular embodiment of the invention, the hydrocarbon radical is a branched, linear or else cyclic alkyl having 1 to 12 carbon atoms, more preferably having 1 to 6 carbon atoms, more preferably still having 1 to 4 carbon atoms, in particular a methyl or an ethyl.

According to another particular embodiment of the invention, the radical R is an alkoxyalkyl, more particularly having 2 to 8 carbon atoms.

In the present application, the expression "SiOR function" is used to denote at least one SiOR function, i.e. one or more SiOR functions.

Generally, a function borne by an elastomer may be located on the elastomer chain according to one of three possible configurations: along the elastomer chain as a pendent group, at one end of the elastomer chain or else within the actual elastomer chain (i.e. not at the ends). The latter case occurs especially in the case where the elastomer is functionalized by the use of a coupling or star-branching agent which provides the function in question.

In particular, the SiOR function borne by the first diene elastomer may be located along the elastomer chain as a pendent group, at one end of the elastomer chain or else within the actual elastomer chain. In the case where there are several SiOR functions borne by the elastomer, they may occupy one or another of the above configurations.

The first diene elastomer may be a linear or star-branched, or even branched polymer. If it is a linear polymer, it may or may not be coupled. This elastomer may have a monomodal, bimodal or polymodal molecular distribution.

According to another preferred embodiment of the invention, the first diene elastomer is predominantly in a linear form, that is to say that if it comprises star-branched or branched chains, these represent a minority weight fraction in this elastomer.

According to another particular embodiment of the invention, the first diene elastomer is prepared by anionic polymerization.

According to one particularly preferred embodiment, the first diene elastomer bears at least one (i.e. one or more) function, referred to as a "silanol" function, of formula SiOH (R is hydrogen).

Diene elastomers corresponding to such a definition are well known, they have for example been described in documents EP 0 778 311 B1, WO 2008/141702, WO 2006/050486, EP 0 877 047 B1 or EP 1 400 559 B1. The silanol function SiOH is preferably located at the end of the elastomer chain, in particular in the form of a dimethylsilanol group —SiMe$_2$SiOH.

According to one particular embodiment of the invention, the silanol function may be bonded to a polysiloxane which constitutes one of the blocks of a block copolymer that also comprises a polydiene block, as described for example in patent EP 0 778 311 B1.

According to another particular embodiment of the invention, the silanol function may be bonded to a polyether constituting one of the blocks of a block copolymer that also comprises a polydiene block, as described for example in application WO 2009/000750.

According to another particularly preferred embodiment, the first diene elastomer bears at least one (i.e. one or more) function of formula SiOR in which R is a hydrocarbon radical.

Diene elastomers corresponding to such a definition are also well known, they have for example been described in documents JP 63-215701, JP 62-227908, U.S. Pat. No. 5,409,969 or WO 2006/050486.

According to one particular embodiment, the SiOR function (with R being a hydrocarbon radical), in particular alkoxysilane function, may be bonded to a polyether which constitutes one of the blocks of a block copolymer that also comprises a polydiene block, as described for example in application WO 2009/000750.

According to another particularly preferred embodiment, the first diene elastomer, bearing at least one (i.e. one or more) function of formula SiOR in which R is hydrogen or a hydrocarbon radical, also bears at least one other (i.e. one or more) function that is different from the SiOR function. This other function is preferably selected from the group consisting of epoxy, tin or amine functions, it being possible for the amine to be a primary, secondary or tertiary amine. Amine functions are particularly preferred.

Elastomers bearing both an SiOR function and an epoxy function have for example been described in patents EP 0 890 607 B1 and EP 0 692 492 B1. Elastomers bearing both an SiOR function and a tin function have for example been described in patent EP 1 000 970 B1.

According to a more preferred embodiment, this other function borne by the first diene elastomer is an amine function, more preferably a tertiary amine.

The amine function may be located on the same end (or the same ends) of the elastomer chain as the SiOR function. Elastomers having an SiOR function and an amine function on the same end of the elastomer chain have been described for example in the patents or patent applications EP 1 457

501 B1, WO 2006/076629, EP 0 341 496 B1 or WO 2009/133068 or else in WO 2004/111094.

As a functionalizing agent that gives rise to the synthesis of an elastomer bearing an alkoxysilane function and an amine function, mention may be made, by way of example, of N,N-dialkylaminopropyltrialkoxysilanes, cyclic azadialkoxysilanes such as N-alkyl-aza-dialkoxysilacycloalkanes, 2-pyridylethyltrialkoxysilanes, 3-carbazolethyltrialkoxysilanes, 3-alkylideneaminopropyltrialkoxysilanes, N-trialkoxysilylpropylmorpholines, especially 3-(N,N-dimethylaminopropyl)trimethoxysilane, 3-(1,3-dimethylbutylidene)aminopropyltriethoxysilane, N-n-butyl-aza-2,2-dimethoxysilacyclopentane, 2-(4-pyridylethyl)triethoxysilane and 2-(trimethoxysilyl)pyridine.

According to another embodiment, the amine function may be present on an end of the elastomer chain that does not bear the SiOR function. Such a configuration may be produced for example by the use of an initiator bearing an amine function, in particular by the use of an initiator that is a lithium amide, such as lithium pyrrolidide or lithium hexamethyleneimide, or an organolithium compound bearing an amine function such as dimethylaminopropyllithium and 3-pyrrolidinopropyllithium. Such initiators have been described for example in patents EP 0 590 490 B1 and EP 0 626 278 B1. Such elastomers bearing an SiOR function and an amine function at their different chain ends have for example been described in patents EP 0 778 311 B1 and U.S. Pat. No. 5,508,333.

According to another particularly preferred embodiment, which can be applied to each of the embodiments described previously, the first diene elastomer comprises, besides the diene units, vinylaromatic units, in particular styrene units. Preferably, the diene units are butadiene units, preferably combined with styrene units. Advantageously it is a copolymer of styrene and butadiene, SBR, preferably a solution SBR (SSBR). More advantageously, the SBR has a glass transition temperature in a range extending from −55° C. to −5° C., preferably from −50° C. to −10° C.

Thus, according to one advantageous embodiment of the invention, the first diene elastomer is an SBR, preferably an SSBR, bearing at least one silanol function, preferably positioned at the end of the elastomer chain.

According to an even more preferred embodiment of the invention, the first diene elastomer is an SBR, preferably an SSBR, bearing a single silanol function, preferably positioned at the end of the elastomer chain.

According to another advantageous embodiment of the invention, the first diene elastomer is an SBR, preferably an SSBR, bearing at least one SiOR function (with R being a hydrocarbon radical), in particular alkoxysilane function, and at least one amine function, preferably a tertiary amine function, which are preferably both positioned within the elastomer chain.

According to an even more preferred embodiment of the invention, the first diene elastomer is an SBR, preferably an SSBR, bearing a single alkoxysilane function and a single amine function, preferably a tertiary amine function, which are preferably both positioned within the elastomer chain.

It is understood that the first diene elastomer bearing an SiOR function may be formed by a mixture of elastomers that differ from one another by the chemical nature of the SiOR function, by its position on the elastomer chain, by the presence of an additional function other than SiOR, by their microstructure or else by their macrostructure.

According to one preferred embodiment of the invention, the first diene elastomer is a blend of an elastomer bearing at least one silanol function and an elastomer bearing at least one SiOR function (with R being a hydrocarbon radical), in particular alkoxysilane function, and at least one amine function.

According to one preferred embodiment of the invention, the first diene elastomer is a blend of an elastomer bearing a silanol function at the end of the elastomer chain and an elastomer bearing an alkoxysilane function and an amine function, both within the elastomer chain.

According to another preferred embodiment of the invention, the content of the first diene elastomer is preferably in a range extending from 40 to 100 phr, more preferably from 50 to 100 phr, more preferably still from 70 to 100 phr, especially from 80 to 100 phr.

When the composition of the tread of the tyre in accordance with the invention comprises an optional, second diene elastomer, this elastomer is different from the first elastomer in so far as it does not bear an SiOR function. Nevertheless, this second elastomer may have a microstructure or a macrostructure that may be identical to or different from those of the first diene elastomer. It is used in a proportion ranging from 0 to 80 phr, preferably from 0 to 60 phr, more preferably still from 0 to 30 phr, especially from 0 to 20 phr.

According to one preferred embodiment of the invention, this second diene elastomer is selected from the group consisting of polybutadienes, natural rubber, synthetic polyisoprenes, butadiene copolymers, isoprene copolymers and blends of these elastomers.

According to one particular embodiment of the invention, this second diene elastomer is a polybutadiene. The polybutadiene is preferably a cis-1,4-polybutadiene, i.e., a polybutadiene having a content of cis-1,4-bonds of greater than 90% (molar %), preferably greater than or equal to 96% (molar %).

According to another particular embodiment of the invention, this second diene elastomer is a butadiene copolymer, in particular an SBR, preferably a solution SBR.

According to another particular embodiment of the invention, this second elastomer may bear at least one function (other than an SiOR function of course), in particular a tin function. This second elastomer is advantageously a diene elastomer coupled or star-branched to tin.

It is understood that the second diene elastomer may be formed by a mixture of diene elastomers that differ from one another by their microstructure, by their macrostructure or by the presence of a function, by the nature or the position of the latter on the elastomer chain.

As functions other than the aforementioned tin, mention may be made, by way of example, of amino functional groups such as benzophenone for example, carboxylic groups (as described for example in WO 01/92402 or U.S. Pat. No. 6,815,473, WO 2004/096865 or US 2006/0089445), polyether groups (as described for example in EP 1 127 909 or U.S. Pat. No. 6,503,973) or epoxy groups.

I-2. Reinforcing Filler

As another essential feature, the rubber composition of the tread of the tyre in accordance with the invention comprises a reinforcing inorganic filler in a specific amount, in a proportion ranging from 100 to 160 phr.

The expression "reinforcing inorganic filler" should be understood here to mean any inorganic or mineral filler, whatever its colour and its origin (natural or synthetic), also referred to as "white filler", "clear filler" or even "non-black filler", in contrast to carbon black, capable of reinforcing by itself alone, without means other than an intermediate coupling agent, a rubber composition intended for the manufacture of pneumatic tyres, in other words capable of replacing, in its reinforcing role, a conventional tyre-grade carbon black; such a filler is generally characterized, in a known manner, by the presence of hydroxyl (—OH) groups at its surface.

Mineral fillers of the siliceous type, preferably silica ($SiO_2$), are suitable in particular as reinforcing inorganic fillers. The silica used may be any reinforcing silica known to a person skilled in the art, in particular any precipitated or pyrogenic silica having a BET surface area and a CTAB specific surface area that are both less than 450 $m^2/g$, preferably from 30 to 400 $m^2/g$, in particular between 60 and 300 $m^2/g$. Mention will be made, as highly dispersible precipitated silicas ("HDSs"), for example, of the Ultrasil 7000 and Ultrasil 7005 silicas from Degussa, the Zeosil 1165 MP, 1135 MP and 1115 MP silicas from Rhodia, the Hi-Sil EZ150G silica from PPG, the Zeopol 8715, 8745 and 8755 silicas from Huber or the silicas with a high specific surface area as described in application WO 03/16387.

Mention will also be made, as reinforcing inorganic filler, of mineral fillers of the aluminous type, in particular alumina ($Al_2O_3$) or aluminium (oxide)hydroxides, or else reinforcing titanium oxides.

A person skilled in the art will understand that a reinforcing filler of another nature, in particular organic nature, such as carbon black, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer. By way of example, mention may be made, for example, of carbon blacks for tyres, such as described, for example, in patent documents WO 96/37547 and WO 99/28380.

Advantageously, the content of reinforcing inorganic filler is in a range extending from 105 to 150 phr, more advantageously from 110 to 140 phr.

According to one preferred embodiment of the invention, the reinforcing inorganic filler comprises from 50% to 100% by weight of silica.

According to another advantageous embodiment, the rubber composition of the tread of the tyre in accordance with the invention may comprise carbon black. The carbon black, when it is present, is preferably used at a content of less than 20 phr, more preferably of less than 10 phr (for example between 0.5 and 20 phr, in particular between 2 and 10 phr). In the ranges indicated, the colouring properties (black pigmenting agent) and UV-stabilizing properties of the carbon blacks are benefited from, without, moreover, adversely affecting the typical performances provided by the reinforcing inorganic filler.

In order to couple the reinforcing inorganic filler to the diene elastomer, use is made, in a known manner, of a coupling agent (or bonding agent) intended to provide a satisfactory connection, of chemical and/or physical nature, between the inorganic filler (surface of its particles) and the diene elastomer. This coupling agent is at least bifunctional. Use is made in particular of at least bifunctional organosilanes or polyorganosiloxanes.

Use is made in particular of silane polysulphides, referred to as "symmetrical" or "asymmetrical" depending on their particular structure, as described, for example, in applications WO 03/002648 (or US 2005/016651) and WO 03/002649 (or US 2005/016650).

Particularly suitable, without the definition below being limiting, are silane polysulphides corresponding to the following general formula (I):

Z-A-$S_x$-A-Z, in which:     (I)

x is an integer from 2 to 8 (preferably from 2 to 5);
the A symbols, which are identical or different, represent a divalent hydrocarbon radical (preferably, a $C_1$-$C_{18}$ alkylene group or a $C_6$-$C_{12}$ arylene group, more particularly a $C_1$-$C_{10}$, especially $C_1$-$C_4$, alkylene, in particular propylene);
the Z symbols, which are identical or different, correspond to one of the three formulae below:

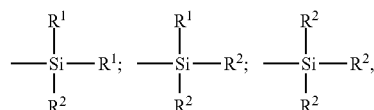

in which:
the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl);
the $R^2$ radicals, which are substituted or unsubstituted and identical to or different from one another, represent a $C_1$-$C_{18}$ alkoxyl or $C_5$-$C_{18}$ cycloalkoxyl group (preferably a group selected from $C_1$-$C_8$ alkoxyls and $C_5$-$C_8$ cycloalkoxyls, more preferably still a group selected from $C_1$-$C_4$ alkoxyls, in particular methoxyl and ethoxyl).

In the case of a mixture of alkoxysilane polysulphides corresponding to the above formula (I), in particular the standard commercially available mixtures, the mean value of the "x" index is a fractional number preferably between 2 and 5, more preferably close to 4. However, the invention may also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)polysulphides. Use is in particular made, among these compounds, of bis(3-triethoxysilylpropyl)tetrasulphide, abbreviated to TESPT, of formula [($C_2H_5O$)$_3$Si($CH_2$)$_3S_2$]$_2$, or bis(triethoxysilylpropyl)disulphide, abbreviated to TESPD, of formula [($C_2H_5O$)$_3$Si($CH_2$)$_3$S]$_2$. Mention will also be made, as preferred examples, of bis(mono($C_1$-$C_4$) alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, such as described in the aforementioned patent application WO 02/083782 (or U.S. Pat. No. 7,217,751).

Mention will in particular be made, as examples of coupling agents other than an alkoxysilane polysulphide, of bifunctional POSs (polyorganosiloxanes) or else of hydroxysilane polysulphides ($R^2$=OH in the above formula I), such as described, for example, in patent applications WO 02/30939 (or U.S. Pat. No. 6,774,255), WO 02/31041 (or US 2004/051210) and WO 2007/061550, or else of silanes or POSs bearing azodicarbonyl functional groups, such as described, for example, in patent applications WO 2006/125532, WO 2006/125533 and WO 2006/125534.

Mention will be made, as examples of other silane sulphides, for example, of the silanes bearing at least one thiol (—SH) function (referred to as mercaptosilanes) and/or at least one masked thiol function, such as described, for example, in patents or patent applications U.S. Pat. No. 6,849,754, WO 99/09036, WO 2006/023815 and WO 2007/098080.

Of course, use might also be made of mixtures of the coupling agents described above, as described in particular in the abovementioned application WO 2006/125534.

The content of coupling agent is preferably between 2 and 20 phr, more preferably between 3 and 15 phr.

I-3. Plasticizing System:

Another essential feature of the rubber composition of the tread of the tyre in accordance with the invention is to comprise a specific plasticizing system, comprising, on the one hand, in a content A of between 5 and 60 phr, a hydrocarbon resin having a Tg above 20° C., and on the other hand, in a content B of between 5 and 60 phr, a liquid plasticizing agent, it being understood that the total content A+B is greater than 45 phr, in particular between 45 and 100 phr.

According to one preferred embodiment of the invention, the content A of hydrocarbon resin is between 10 and 50 phr and the content B of liquid plasticizer is between 10 and 50 phr.

According to another preferred embodiment of the invention, the total content A+B of hydrocarbon resin and liquid plasticizer is between 50 and 100 phr, more preferably between 50 and 80 phr, in particular between 50 and 70 phr.

According to another particular embodiment of the invention, the ratio of A to B is between 1:5 and 5:1 (i.e. between 0.2 and 5.0), preferably between 1:4 and 4:1 (i.e. between 0.25 and 4.0).

According to another particular embodiment of the invention, the weight ratio of (A+B) to the mass of reinforcing inorganic filler, in particular silica, is between 35% and 70%, preferably in a range extending from 40% to 60%.

In a manner known to a person skilled in the art, the designation "resin" is reserved in the present application, by definition, for a compound which is solid at ambient temperature (23° C.), in contrast to a liquid plasticizing compound, such as an oil.

Hydrocarbon resins are polymers well known to those skilled in the art, essentially based on carbon and hydrogen but which may comprise other types of atoms, which can be used in particular as plasticizing agents or tackifiers in polymeric matrices. They are by nature miscible (i.e. compatible) in the contents used with the polymer compositions for which they are intended, so as to act as true diluents. They have been described for example in the work entitled "Hydrocarbon Resins" by R. Mildenberg, M. Zander and G. Collin (New York, VCH, 1997, ISBN 3-527-28617-9), Chapter 5 of which is devoted to their applications, especially in rubber tyres (5.5. "Rubber Tires and Mechanical Goods"). They may be aliphatic, cycloaliphatic, aromatic, hydrogenated aromatic, of the aliphatic/aromatic type, i.e. based on aliphatic and/or aromatic monomers. They may be natural or synthetic resins, whether or not based on petroleum (if such is the case, they are also known as petroleum resins). Their Tg is preferably above 0° C., in particular above 20° C. (usually between 30° C. and 95° C.).

As is known, these hydrocarbon resins may also be termed thermoplastic resins in the sense that they soften when heated and may thus be moulded. They may also be defined by a softening point or temperature. The softening point of a hydrocarbon resin is generally about 50 to 60° C. higher than its Tg value. The softening point is measured according to standard ISO 4625 (ring-and-ball method). The macrostructure (Mw, Mn and Ip) is determined by size exclusion chromatography (SEC) as indicated below.

To recapitulate, SEC analysis, for example, consists in separating the macromolecules in solution according to their size through columns filled with a porous gel; the molecules are separated according to their hydrodynamic volume, the bulkiest being eluted first. The sample to be analysed is simply dissolved beforehand in an appropriate solvent, tetrahydrofuran at a concentration of 1 g/liter. The solution is then filtered through a filter with a porosity of 0.45 lam, before injection into the apparatus. The apparatus used is, for example, a "Waters Alliance" chromatographic line according to the following conditions:

elution solvent: tetrahydrofuran;
temperature: 35° C.;
concentration: 1 g/liter;
flow rate: 1 ml/min;
injected volume: 100 µl;
Moore calibration with polystyrene standards;
set of 3 "Waters" columns in series ("Styragel HR4E", "Styragel HR1" and "Styragel HR 0.5");
detection by differential refractometer (for example "WATERS 2410") which may be equipped with operating software (for example "Waters Millenium").

A Moore calibration is carried out with a series of commercial polystyrene standards having a low Ip (less than 1.2), with known molar masses, covering the range of masses to be analysed.

The weight-average molar mass (Mw), the number-average molar mass (Mn) and the polydispersity index (Ip=Mw/Mn) are deduced from the data recorded (curve of distribution by mass of the molar masses).

All the values for molar masses shown in the present application are thus relative to calibration curves produced with polystyrene standards.

According to one preferred embodiment of the invention, the hydrocarbon resin exhibits at least any one, more preferably all, of the following characteristics:

a Tg of above 25° C. (in particular between 30° C. and 100° C.), more preferably above 30° C. (in particular between 30° C. and 95° C.);
a softening point above 50° C. (in particular between 50° C. and 150° C.);
a number-average molar mass (Mn) between 400 and 2000 g/mol, preferably between 500 and 1500 g/mol;
a polydispersity index (Ip) of less than 3, preferably of less than 2 (reminder: Ip=Mw/Mn with Mw the weight-average molar mass).

As examples of such hydrocarbon resins, mention may be made of those selected from the group consisting of cyclopentadiene (abbreviated to CPD) homopolymer or copolymer resins, dicyclopentadiene (abbreviated to DCPD) homopolymer or copolymer resins, terpene homopolymer or copolymer resins, $C_5$-cut homopolymer or copolymer resins, $C_9$-cut homopolymer or copolymer resins, α-methylstyrene homopolymer or copolymer resins and blends of these resins. Among the above copolymer resins, mention may more particularly be made of those selected from the group consisting of (D)CPD/vinylaromatic copolymer resins, (D)CPD/terpene copolymer resins, terpene/phenol copolymer resins, (D)CPD/$C_5$-cut copolymer resins, (D)CPD/$C_9$-cut copolymer resins, terpene/vinylaromatic copolymer resins, terpene/phenol copolymer resins, $C_5$-cut/vinylaromatic copolymer resins and blends of these resins.

The term "terpene" includes here, as is known, α-pinene, β-pinene and limonene monomers. It is preferable to use a limonene monomer, a compound which, as is known, is in the form of three possible isomers: L-limonene (laevorotatory enantiomer), D-limonene (dextrorotatory enantiomer), or else dipentene, the racemic mixture of the dextrorotatory and laevorotatory enantiomers. Suitable vinylaromatic monomers are for example: styrene, α-methylstyrene, ortho-methylstyrene, meta-methylstyrene and para-methylstyrene, vinyltoluene, para-(tert-butyl)styrene, methoxystyrenes, chlorostyrenes, hydroxystyrenes, vinylmesitylene, divinylbenzene, vinylnaphthalene and any vinylaromatic monomer derived from a $C_9$-cut (or more generally a $C_8$- to $C_{10}$-cut).

More particularly, mention may be made of resins selected from the group consisting of (D)CPD homopolymer resins, (D)CPD/styrene copolymer resins, polylimonene resins, limonene/styrene copolymer resins, limonene/D(CPD) copolymer resins, $C_5$-cut/styrene copolymer resins, $C_5$-cut/$C_9$-cut copolymer resins and blends of these resins.

All the above resins are well known to those skilled in the art and are commercially available, for example sold by DRT under the name "Dercolyte" as regards polylimonene resins, sold by Neville Chemical Company under the name "Super Nevtac", by Kolon under the name "Hikorez" or by Exxon Mobil under the name "Escorez" as regards $C_5$-cut/styrene resins or $C_5$-cut/$C_9$-cut resins, or else by Struktol under the name "40 MS" or "40 NS" (blends of aromatic and/or aliphatic resins).

The rubber composition of the tread of the tyre of the invention has another essential feature of comprising between 5 and 60 phr of a liquid plasticizing agent (which is liquid at 23° C.), the role of which is to soften the matrix by diluting the elastomer and the reinforcing filler; its Tg is preferably below −20° C., more preferably below −40° C.

Any extending oil, whether of aromatic or non-aromatic nature, any liquid plasticizing agent known for its plasticizing properties with regard to diene elastomers, can be used. At ambient temperature (23° C.), these plasticizers or these oils, which are more or less viscous, are liquids (that is to say, as a reminder, substances that have the ability to eventually take on the shape of their container), as opposed, in particular, to plasticizing hydrocarbon resins which are by nature solid at ambient temperature.

Liquid plasticizing agents selected from the group consisting of liquid diene polymers, polyolefin oils, naphthenic oils, paraffinic oils, DAE oils, MES (Medium Extracted Solvate) oils, TDAE (Treated Distillate Aromatic Extract) oils, RAE (Residual Aromatic Extract) oils, TRAE (Treated Residual Aromatic Extract) oils and SRAE (Safety Residual Aromatic Extract) oils, mineral oils, vegetable oils, ether plasticizers, ester plasticizers, phosphate plasticizers, sulphonate plasticizers and mixtures of these compounds are particularly suitable. According to a more preferred embodiment, the liquid plasticizing agent is selected from the group consisting of MES oils, TDAE oils, naphthenic oils, vegetable oils and mixtures of these oils.

According to one particular embodiment of the invention, the liquid plasticizer is a petroleum oil, preferably a non-aromatic petroleum oil.

A liquid plasticizer is described as non-aromatic when it has a content of polycyclic aromatic compounds, determined with the extract in DMSO according to the IP 346 method, of less than 3% by weight, relative to the total weight of the plasticizer.

Therefore, use may be made of a liquid plasticizing agent selected from the group consisting of MES oils, TDAE oils, naphthenic oils (of low or high viscosity, in particular which are hydrogenated or non-hydrogenated), paraffinic oils and mixtures of these oils.

Also suitable as petroleum oils are RAE oils, TRAE oils and SRAE oils or mixtures of these oils, which contain low contents of polycyclic compounds.

According to another particular embodiment of the invention, the liquid plasticizer is a terpene derivative. By way of example, the product Dimarone from Yasuhara may be mentioned.

Also suitable are the liquid polymers resulting from the polymerization of olefins or dienes, such as polybutenes, polydienes, in particular polybutadienes, polyisoprenes (also known under the name LIRs) or copolymers of butadiene and isoprene, or else copolymers of butadiene or isoprene and styrene or blends of these liquid polymers. The number-average molar mass of such liquid polymers is preferably in a range extending from 500 g/mol to 50000 g/mol, more preferably from 1000 g/mol to 10000 g/mol. Mention may be made, by way of example, of the RICON products from SARTOMER.

According to another particular embodiment of the invention, the liquid plasticizer is a vegetable oil. By way of example, mention may be made of an oil selected from the group consisting of linseed, safflower, soybean, corn, cottonseed, turnip seed, castor, tung, pine, sunflower, palm, olive, coconut, groundnut and grapeseed oils, and mixtures of these oils. The vegetable oil is preferably rich in oleic acid, that is to say that the fatty acid (or all of the fatty acids if several are present) from which it derives, comprises oleic acid in a weight fraction at least equal to 60%, more preferably still in a weight fraction at least equal to 70%, especially at least equal to 80%. As vegetable oil, use is advantageously made of a sunflower oil which is such that all of the fatty acids from which it derives comprise oleic acid in a weight fraction greater than or equal to 60%, preferably 70% and, according to one particularly advantageous embodiment of the invention, in a weight fraction greater than or equal to 80%.

According to another particular embodiment of the invention, the liquid plasticizer is a triester selected from the group consisting of carboxylic acid triesters, phosphoric acid trimesters, sulphonic acid triesters and mixtures of these triesters.

Particularly suitable are the liquid plasticizers selected from the group consisting of ester plasticizers, phosphate plasticizers, sulphonate plasticizers and mixtures of these compounds.

Mention may be made, as phosphate plasticizers for example, of those that contain between 12 and 30 carbon atoms, for example trioctyl phosphate.

As examples of carboxylic acid ester plasticizers, mention may especially be made of the compounds selected from the group consisting of trimellitates, pyromellitates, phthalates, 1,2-cyclohexane dicarboxylates, adipates, azelates, sebacates, glycerol triesters and mixtures of these compounds. Among the above triesters, mention may especially be made of glycerol triesters, preferably consisting predominantly (of more than 50%, more preferably of more than 80% by weight) of an unsaturated $C_{18}$ fatty acid, i.e. selected from the group consisting of oleic acid, linoleic acid, linolenic acid and mixtures of these acids. The glycerol triester is preferred. More preferably, whether it is of synthetic origin or natural origin (the case for example for sunflower or rapeseed vegetable oils), the fatty acid used consists of more than 50% by weight, more preferably still more than 80% by weight, of oleic acid. Such triesters (trioleates) having a high content of oleic acid are well known; they have been described for example in application WO 02/088238 as plasticizing agents in tyre treads.

According to another particular embodiment of the invention, the liquid plasticizer is an ether. Therefore, mention may be made of polyethylene glycols or polypropylene glycols.

I-4. Various Additives:

The rubber compositions of the treads of the tyres in accordance with the invention may also comprise all or some of the standard additives customarily used in elastomer compositions intended for the manufacture of treads for tyres, especially tyres, fillers other than those mentioned above, for example non-reinforcing fillers such as chalk, or else platy fillers such as kaolin and talc, pigments, protective agents such as antiozone waxes, chemical antiozonants, antioxidants, reinforcing resins (such as resorcinol or bismaleimide), methylene acceptors (for example phenolic novolac resin) or methylene donors (for example HMT or H3M) as described for example in application WO 02/10269, a crosslinking system based either on sulphur, or on sulphur donors and/or on peroxide and/or on bismaleimides, vulcanization accelerators or vulcanization retarders, and vulcanization activators.

These compositions may also contain coupling activators when a coupling agent is used, agents for covering the inorganic filler or more generally processing aids capable, in a known way, by virtue of an improvement in the dispersion of the filler in the rubber matrix and of a lowering of the viscosity of the compositions, of improving their ability to be processed in the uncured state, these agents are, for example, hydrolysable silanes, such as alkylalkoxysilanes, polyols, polyethers, amines, or hydroxylated or hydrolysable polyorganosiloxanes.

I-5. Preparation of the Rubber Compositions:

The compositions used in the treads of the tyres of the invention may be manufactured in appropriate mixers using two successive preparation phases well known to a person skilled in the art: a first phase of thermomechanical working or kneading (referred to as a "non-productive" phase) at high temperature, up to a maximum temperature of between 110° C. and 190° C., preferably between 130° C. and 180° C., followed by a second phase of mechanical working (referred to as a "productive" phase) up to a lower temperature, typically below 110° C., for example between 40° C. and 100° C., during which finishing phase the crosslinking system is incorporated.

The process for preparing such compositions comprises, for example, the following stages:
thermomechanically kneading (for example in one or more steps) the diene elastomer(s) with the reinforcing inorganic filler, the coupling agent, where appropriate the carbon black, and the plasticizing system, until a maximum temperature of between 110° C. and 190° C. is reached (referred to as a "non-productive" stage);
cooling the combined mixture to a temperature below 100° C.;
subsequently incorporating, during a second stage (referred to as a "productive" stage), a crosslinking system;
kneading everything up to a maximum temperature below 110° C.

By way of example, the non-productive phase is carried out in a single thermomechanical stage during which, in a first step, all the base constituents (the diene elastomer(s), the plasticizing system, the reinforcing inorganic filler and the coupling agent) are introduced into an appropriate mixer, such as a standard internal mixer, followed, in a second step, for example after kneading for one to two minutes, by the other additives, optional additional filler-covering agents or processing aids, with the exception of the crosslinking system. The total kneading time, in this non-productive phase, is preferably between 1 and 15 min.

After cooling the mixture thus obtained, the crosslinking system is then incorporated in an external mixer, such as an open mill, maintained at a low temperature (for example, between 40° C. and 100° C.). The combined mixture is then mixed (productive phase) for a few minutes, for example between 2 and 15 min.

The crosslinking system itself is preferably based on sulphur and on a primary vulcanization accelerator, in particular an accelerator of the sulphenamide type. Added to this vulcanization system are various known secondary accelerators or vulcanization activators, such as zinc oxide, stearic acid, guanidine derivatives (in particular diphenylguanidine), etc., incorporated during the first non-productive phase and/or during the productive phase. The sulphur content is preferably between 0.5 and 3.0 phr and the primary accelerator content is preferably between 0.5 and 5.0 phr.

Use may be made, as (primary or secondary) accelerator, of any compound capable of acting as accelerator of the vulcanization of diene elastomers in the presence of sulphur, in particular accelerators of the thiazole type and also their derivatives, accelerators of the thiuram and zinc dithiocarbamate types. These accelerators are more preferably selected from the group consisting of 2-mercaptobenzothiazyl disulphide (abbreviated to "MBTS"), N-cyclohexyl-2-benzothiazyl sulphenamide (abbreviated to "CBS"), N,N-dicyclohexyl-2-benzothiazyl sulphenamide (abbreviated to "DCBS"), N-tert-butyl-2-benzothiazyl sulphenamide (abbreviated to "TBBS"), N-tert-butyl-2-benzothiazyl sulphenimide (abbreviated to "TBSI"), zinc dibenzyldithiocarbamate (abbreviated to "ZBEC") and mixtures of these compounds. Preferably, a primary accelerator of the sulphenamide type is used.

The final composition thus obtained may then be calendered, for example in the form of a sheet or a slab, in particular for laboratory characterization, or else is extruded, for example to form a rubber profiled element used for manufacturing a tyre tread, especially for a passenger vehicle.

According to one particular embodiment, the Shore A hardness of the rubber composition according to the invention is in a range extending from 60 to 75. The Shore A hardness of the compositions after curing is assessed in accordance with the standard ASTM D 2240-86.

The invention relates to the tyres described above, both in the uncured state (i.e., before curing) and in the cured state (i.e., after crosslinking or vulcanization).

The invention also applies to the cases where the rubber compositions described above form only one part of treads of composite or hybrid type, especially those consisting of two radially superposed layers of different formulations (referred to as "cap-base" construction), that are both patterned and intended to come into contact with the road when the tyre is rolling, during the service life of the latter. The base part of the formulation described above could then constitute the radially outer layer of the tread intended to come into contact with the ground from the moment when a new tyre starts rolling, or on the other hand its radially inner layer intended to come into contact with the ground at a later stage.

II—EXEMPLARY EMBODIMENTS OF THE INVENTION

II.1—Preparation of the Compositions:

The formulations (in phr) of compositions T1 and C1-1 are described in Table I, those of compositions T2, C2-1, C2-2 and C2-3 in Table II.

These compositions are manufactured in the following manner: the elastomers, the silica, the coupling agent, the plasticizers, and also the various other ingredients, with the exception of the vulcanization system, are successively introduced into an internal mixer (final fill ratio: around 70% by volume), the initial vessel temperature of which is around 60° C. Thermomechanical working (non-productive phase) is then carried out in one stage, which lasts in total approximately 5 min, until a maximum "dropping" temperature of 165° C. is reached.

The mixture thus obtained is recovered and cooled and then sulphur and an accelerator of sulphenamide type are incorporated in a mixer (homofinisher) at 23° C., everything being mixed (productive phase) for an appropriate time (for example, between 5 and 12 min).

Example 1

Compositions T1 and C1-1

Composition T1 is a composition that can be used to form a tread for a "Green Tyre", based on polybutadiene and on an SBR copolymer. In this control composition, the content of reinforcing inorganic filler is less than 100 phr, and the content A+B of plasticizing system is less than 45 phr, consisting of plasticizing resin ($C_5/C_9$, 10 phr) and of vegetable oil (sunflower oil, 15 phr) as liquid plasticizing agent.

The composition C1-1, in accordance with the invention, is characterized by the presence of at least 20 phr of a diene elastomer bearing an SiOR function (R being hydrogen or a hydrocarbon radical), of at least 100 phr of a reinforcing inorganic filler, of more than 45 phr of a plasticizing system consisting of plasticizing resin ($C_5/C_9$) and liquid plasticizing agent (sunflower vegetable oil) at contents respectively between 5 and 60 phr. The elastomer SBR1 of composition C1-1 bears a dimethylsilanol function at one chain end and was prepared according to the process described in patent EP 0 778 311 B1.

Example 2

Compositions T2, C2-1, C2-2 and C2-3

Composition T2 is another conventional composition that can be used to form a tread for a "Green Tyre", based on polybutadiene and on an SBR copolymer. In this control composition, the two elastomers used are devoid of SiOR function, the content of reinforcing inorganic filler is less than 100 phr, and the content A+B of plasticizing system is less than 45 phr, consisting of plasticizing resin (polylimonene, 20 phr) and MES oil (15 phr) as liquid plasticizing agent.

Compositions C2-1, C2-2 and C2-3, in accordance with the invention, are characterized by the presence of at least 20 phr of a diene elastomer bearing an SiOR function (R being hydrogen or a hydrocarbon radical), of at least 100 phr of a reinforcing inorganic filler, of more than 45 phr of a plasticizing system consisting of plasticizing resin (polylimonene) and liquid plasticizing agent (sunflower vegetable oil) at contents respectively between 5 and 60 phr. The elastomer SBR3 of composition C2-1 bears a dimethylsilanol function at one chain end and was prepared according to the process described in patent EP 0 778 311 B1. The elastomer SBR4 of compositions C2-1 and C2-2 bears an alkoxysilane function, in particular a dimethylaminopropylmethoxysilane function, within the elastomer chain and was prepared according to the process described in patent application WO 2009/133068. The elastomer SBR5 of composition C2-3 contains a mixture of 85% of an SBR (SBR5A) bearing a dimethylsilanol function at one chain end and 15% of an SBR (SBR5B) star-branched to tin and of the same microstructure as SBR5A.

The six compositions T1, C1-1, T2, C2-1, C2-2 and C2-3 were extruded in the form of a tread for a passenger vehicle tyre, in order to be tested as indicated in the following paragraph.

II.2—Tests on Tyres:

All the tyres are fitted to the front and rear of a motor vehicle, under nominal inflation pressure.

Example 1

Compositions T1 and C1-1 are used as treads for radial carcass passenger vehicle tyres, denoted respectively PT1 (control tyres) and P1-1 (tyres in accordance with the invention), with dimensions of 225/55R16, which are conventionally manufactured and are in all respects identical apart from the constituent rubber compositions of their treads.

The tyres fitted to a motor vehicle of BMW make and "530" model, equipped with an ABS system, are subjected to braking tests on wet ground at 10° C. that consist in measuring the distance needed to go from 80 km/h to 10 km/h during sudden braking on sprayed ground (bituminous concrete). A value above that of the control, arbitrarily set at 100, indicates an improved result, that is to say a shorter braking distance.

In this test, the results of which appear in Table III, the braking performance on wet ground of the tyres P1-1 in accordance with the invention is compared with that of the tyres PT1 not in accordance with the invention. It is observed that the tyre P1-1 astonishingly has a value of the braking performance on wet ground of 111, i.e. an improvement of around 10% in the braking performance on wet ground compared to the control tyre. This result corresponds, in this test, to a braking distance that is around 4 meters shorter, a distance that is quite significant for a person skilled in the art.

Example 2

Compositions T2, C2-1, C2-2 and C2-3 are used as treads for radial carcass passenger vehicle tyres, denoted respectively PT2 (control tyres), P2-1, P2-2 and P2-3 (tyres in accordance with the invention), with dimensions of 205/55 R16, which are conventionally manufactured and are in all respects identical apart from the constituent rubber compositions of their treads.

The tyres fitted to a motor vehicle of Volkswagen make and "Golf 6" model, equipped with an ABS system, are subjected to another test of grip on wet ground that consists in measuring the minimum time needed for a vehicle equipped with the tyres to travel, at speed limit conditions, around a very winding circuit that is sprayed in order to keep the ground wet. A value above that of the control, arbitrarily set at 100, indicates an improved result, that is to say a shorter travel time.

The rolling resistance is measured on a flywheel, according to the ISO 87-67 (1992) method. A value above that of the control, arbitrarily set at 100, indicates an improved result, that is to say a lower rolling resistance.

The results of the rolling tests are reported in Table IV.

In this test the grip performance on wet ground of the tyres P2-1, P2-2 and P2-3 in accordance with the invention is compared with that of the tyre PT2 not in accordance with the invention. It is observed that the tyres P2-1, P2-2 and P2-3 have a value of the grip performance on wet ground of 106, 105 and 108 respectively. These performance levels of the tyres according to the invention P2-1, P2-2 and P2-3 are astonishly much higher than that of the control tyre PT2, and these results are obtained without significant disadvantageous effects, or even without any disadvantageous effects at all for the rolling resistance.

TABLE I

| | Composition No.: | |
|---|---|---|
| | T1 | C1-1 |
| BR (1) | 20 | 20 |
| SBR1 (2) | 80 | 80 |
| Carbon black (3) | 3 | 3 |
| Silica (4) | 85 | 120 |
| Coupling agent (5) | 6.8 | 9.6 |
| Liquid plasticizer (6) | | 8 |
| Liquid plasticizer (7) | 15 | 25 |
| Resin (8) | 10 | 20 |
| Total plasticizer | 25 | 53 |
| Stearic acid | 2 | 2 |
| Antiozone wax | 1.5 | 1.5 |
| Antioxidant (9) | 2 | 2 |
| DPG (10) | 1.6 | 1.6 |
| ZnO | 1.3 | 1.3 |
| Accelerator (11) | 1.6 | 1.6 |
| Sulphur | 1 | 1 |

(1) BR with 4% of 1,2-units and 93% of cis-1,4-units (Tg = −106° C.);
(2) SBR1: SBR with 44% of styrene units and 41% of 1,2-units of the butadiene part (Tg = −12° C.) bearing a silanol function at the end of the elastomer chain;
(3) ASTM grade N234 (Cabot);
(4) "Zeosil 1165 MP" silica from the company Rhodia of HDS type;
(5) TESPT ("Si69" from the company Degussa);
(6) TDAE oil ("Viva Tec500" from the company Klaus Dahleke)
(7) Sunflower oil containing 85% by weight of oleic acid, "Lubrirob Tod 1880" from the company Novance
(8) C5/C9 resin ("Escorez ECR-373" from the company Exxon);
(9) N-(1,3-dimethylbutyl)-N'-phenyl-p-phenylenediamine, from the company Flexsys;
(10) Diphenylguanidine ("Perkacit" DPG from the company Flexsys);
(11) N-dicylohexyl-2-benzothiazole-sulphenamide ("Santocure CBS" from the company Flexsys).

TABLE II

| | Composition No.: | | | |
|---|---|---|---|---|
| | T2 | C2-1 | C2-2 | C2-3 |
| BR (1) | 25 | | | |
| SBR2 (2) | 75 | | | |
| SBR3 (3) | | 50 | | |
| SBR4 (4) | | 50 | 100 | |
| SBR5 (5) | | | | 100 |
| Carbon black (6) | 3 | 3 | 3 | 3 |
| Silica (7) | 80 | 110 | 110 | 110 |
| Coupling agent (8) | 6.4 | 8.8 | 8.8 | 8.8 |
| Liquid plasticizer (9) | 15 | | | |
| Liquid plasticizer (10) | | 20 | 15 | 15 |
| Resin (11) | 20 | 35 | 45 | 45 |

TABLE II-continued

| | Composition No.: | | | |
|---|---|---|---|---|
| | T2 | C2-1 | C2-2 | C2-3 |
| Total plasticizer | 35 | 55 | 60 | 60 |
| Stearic acid | 2 | 2 | 2 | 2 |
| Antiozone wax | 1.8 | 1.8 | 1.8 | 1.8 |
| Antioxidant (12) | 2.6 | 2.6 | 2.6 | 2.6 |
| DPG (13) | 1.8 | 1.8 | 1.8 | 1.8 |
| ZnO | 1.2 | 1.2 | 1.2 | 1.2 |
| Accelerator (14) | 2.3 | 2.3 | 2.3 | 2.3 |
| Sulphur | 1 | 1 | 1 | 1 |

(1) BR with 4% of 1,2-units and 93% of cis-1,4-units (Tg = −106° C.);
(2) SBR2: SBR with 25% of styrene units and 58% of 1,2-units of the butadiene part (Tg = −24° C.);
(3) SBR3: SBR with 25% of styrene units and 58% of 1,2-units of the butadiene part (Tg = −24° C.) bearing a silanol function at the end of the elastomer chain;
(4) SBR4: SBR with 27% of styrene units and 24% of 1,2-units of the butadiene part (Tg = −48° C.) bearing an alkoxysilane function within the elastomer chain;
(5) SBR5: SBR (Sn star-branched) with 27% of styrene units and 24% of 1,2-units of the butadiene part (Tg = −48° C.) bearing a silanol function at the end of the elastomer chain;
(6) ASTM grade N234 (Cabot);
(7) "Zeosil 1165 MP" silica from the company Rhodia of HDS type;
(8) TESPT ("Si69" from the company Degussa);
(9) MES oil ("Catenex SNR" from Shell);
(10) Sunflower oil containing 85% by weight of oleic acid, "Lubrirob Tod 1880" from the company Novance;
(11) Polylimonene resin "Dercolyte L120" from the company DRT;
(12) N-(1,3-dimethylbutyl)-N'-phenyl-p-phenylenediamine, from the company Flexsys;
(13) Diphenylguanidine ("Perkacit" DPG from the company Flexsys);
(14) N-dicyclohexyl-2-benzothiazole sulphenamide ("Santocure CBS" from the company Flexsys).

TABLE III

| | Tyre | |
|---|---|---|
| | PT1 | P1-1 |
| Composition No.: | T1-1 | C1-1 |
| Braking on wet ground | 100 | 111 |

TABLE IV

| | Tyre | | | |
|---|---|---|---|---|
| | PT2 | P2-1 | P2-2 | P2-3 |
| Composition No.: | T2 | C2-1 | C2-2 | C2-3 |
| Grip on wet ground | 100 | 106 | 105 | 108 |
| Rolling resistance | 100 | 97 | 100 | 97 |

The invention claimed is:

1. A tire comprising a tread formed of at least a rubber composition, wherein the rubber composition includes:
   50 to 100 phr of a first diene elastomer bearing a single SiOR function, R being hydrogen or a hydrocarbon radical;
   105 to 150 phr of silica;
   less than 8 phr of carbon black;
   a plasticizing system that includes:
      a content A of between 5 and 60 phr of a hydrocarbon resin having a Tg above 20° C., and
      a content B of between 5 and 60 phr of a liquid plasticizing agent,
      wherein a total content A+B is between 50 and 80 phr.

2. The tire according to claim 1, wherein the first diene elastomer is a butadiene-styrene copolymer.

3. The tire according to claim 1, wherein R is hydrogen.

4. The tire according to claim 1, wherein R is an alkyl.

5. The tire according to claim 1, wherein the rubber composition further includes:
   0 to 80 phr of a second diene elastomer.

6. The tire according to claim 5, wherein the second diene elastomer is selected from the group consisting of polybutadienes, natural rubber, synthetic polyisoprenes, butadiene copolymers, isoprene copolymers, and blends thereof.

7. The tire according to claim 5, wherein the second diene elastomer bears at least one tin function.

8. The tire according to claim 1, wherein a ratio of the content A to the content B is between 1:5 and 5:1.

9. The tire according to claim 1, wherein the hydrocarbon resin is selected from the group consisting of cyclopentadiene homopolymer or copolymer resins, dicyclopentadiene homopolymer or copolymer resins, terpene homopolymer or copolymer resins, $C_5$-cut homopolymer or copolymer resins, $C_9$-cut homopolymer or copolymer resins, α-methylstyrene homopolymer or copolymer resins, and blends thereof.

10. The tire according to claim 1, wherein the liquid plasticizing agent is selected from the group consisting of liquid diene polymers, polyolefin oils, naphthenic oils, paraffinic oils, distillate aromatic extract oils, medium extracted solvate oils, treated distillate aromatic extract oils, residual aromatic extract oils, treated residual aromatic extract oils, safety residual aromatic extract oils, mineral oils, vegetable oils, ether plasticizers, ester plasticizers, phosphate plasticizers, sulphonate plasticizers, and mixtures thereof.

11. The tire according to claim 1, wherein a weight ratio of a weight of the total content A+B to a weight of the reinforcing inorganic filler is between 35% and 70%.

12. A tire comprising a tread formed of at least a rubber composition, wherein the rubber composition includes:
   50 to 100 phr of a first diene elastomer bearing a single SiOR function, R being hydrogen or a hydrocarbon radical;
   105 to 150 phr of silica;
   less than 10 phr of carbon black;
   a plasticizing system that includes:
      a content A of between 5 and 60 phr of a hydrocarbon resin having a Tg above 20° C., and
      a content B of between 5 and 60 phr of a liquid plasticizing agent,
      wherein a total content A+B is between 50 and 80 phr, and
   wherein the composition comprises no elastomer other than the first diene elastomer and an optional second diene elastomer, the optional second diene elastomer being a polybutadiene or butadiene copolymer.

13. The tire according to claim 12, wherein the first diene elastomer is a butadiene-styrene copolymer.

14. The tire according to claim 12, wherein R is hydrogen.

15. The tire according to claim 12, wherein R is an alkyl.

16. The tire according to claim 12, wherein the optional second diene elastomer bears at least one tin function.

17. The tire according to claim 12, wherein a ratio of the content A to the content B is between 1:5 and 5:1.

18. The tire according to claim 12, wherein the hydrocarbon resin is selected from the group consisting of cyclopentadiene homopolymer or copolymer resins, dicyclopentadiene homopolymer or copolymer resins, terpene homopolymer or copolymer resins, $C_5$-cut homopolymer or copolymer resins, $C_9$-cut homopolymer or copolymer resins, α-methylstyrene homopolymer or copolymer resins, and blends thereof.

19. The tire according to claim 12, wherein the liquid plasticizing agent is selected from the group consisting of liquid diene polymers, polyolefin oils, naphthenic oils, paraffinic oils, distillate aromatic extract oils, medium extracted solvate oils, treated distillate aromatic extract oils, residual aromatic extract oils, treated residual aromatic extract oils, safety residual aromatic extract oils, mineral oils, vegetable oils, ether plasticizers, ester plasticizers, phosphate plasticizers, sulphonate plasticizers, and mixtures thereof.

20. The tire according to claim 12, wherein a weight ratio of a weight of the total content A+B to a weight of the reinforcing inorganic filler is between 35% and 70%.

21. A tire comprising a tread formed of at least a rubber composition, wherein the rubber composition includes:
   50 to 100 phr of a first diene elastomer bearing a single SiOR function, R being hydrogen or a hydrocarbon radical;
   105 to 150 phr of silica;
   less than 8 phr of carbon black;
   a plasticizing system that includes:
      a content A of between 5 and 60 phr of a hydrocarbon resin having a Tg above 20° C., and
      a content B of between 5 and 60 phr of a liquid plasticizing agent,
      wherein a total content A+B is between 50 and 80 phr, and
   wherein the composition comprises no elastomer other than the first diene elastomer and an optional second diene elastomer, the optional second diene elastomer being a polybutadiene or butadiene copolymer.

22. The tire according to claim 21, wherein the first diene elastomer is a butadiene-styrene copolymer.

23. The tire according to claim 21, wherein R is hydrogen.

24. The tire according to claim 21, wherein R is an alkyl.

25. The tire according to claim 21, wherein the optional second diene elastomer bears at least one tin function.

26. The tire according to claim 21, wherein a ratio of the content A to the content B is between 1:5 and 5:1.

27. The tire according to claim 21, wherein the hydrocarbon resin is selected from the group consisting of cyclopentadiene homopolymer or copolymer resins, dicyclopentadiene homopolymer or copolymer resins, terpene homopolymer or copolymer resins, $C_5$-cut homopolymer or copolymer resins, $C_9$-cut homopolymer or copolymer resins, α-methylstyrene homopolymer or copolymer resins, and blends thereof.

28. The tire according to claim 21, wherein the liquid plasticizing agent is selected from the group consisting of liquid diene polymers, polyolefin oils, naphthenic oils, paraffinic oils, distillate aromatic extract oils, medium extracted solvate oils, treated distillate aromatic extract oils, residual aromatic extract oils, treated residual aromatic extract oils, safety residual aromatic extract oils, mineral oils, vegetable oils, ether plasticizers, ester plasticizers, phosphate plasticizers, sulphonate plasticizers, and mixtures thereof.

29. The tire according to claim 21, wherein a weight ratio of a weight of the total content A+B to a weight of the reinforcing inorganic filler is between 35% and 70%.

* * * * *